United States Patent [19]

Hofferber et al.

[11] 4,114,842

[45] Sep. 19, 1978

[54] ACCELERATION LIMITED PRESELECT ALTITUDE CAPTURE AND CONTROL

[75] Inventors: Henry E. Hofferber; Robert H. Parker, both of Phoenix, Ariz.

[73] Assignee: Sperry Rand Corporation, New York, N.Y.

[21] Appl. No.: 782,153

[22] Filed: Mar. 28, 1977

[51] Int. Cl.² .............................................. G05D 1/08
[52] U.S. Cl. ................................... 244/180; 364/433; 364/434; 318/584
[58] Field of Search ......................... 73/178 R, 178 T; 235/150.2, 150.22, 150.27; 244/180, 183, 186, 187, 196, 197; 318/584, 590, 591

[56] References Cited

U.S. PATENT DOCUMENTS

| | | | |
|---|---|---|---|
| 3,167,276 | 1/1965 | Moosbrugger et al. | 318/584 X |
| 3,240,446 | 3/1966 | Miller | 318/584 X |
| 3,510,092 | 5/1970 | Hendrick et al. | 318/584 X |
| 3,524,612 | 8/1970 | Ainsworth et al. | 244/180 |
| 3,892,373 | 7/1975 | Doniger | 235/150.22 X |

Primary Examiner—Stephen G. Kunin
Attorney, Agent, or Firm—Howard P. Terry

[57] ABSTRACT

The altitude acquisition and control system cooperates in an aircraft flight controller for permitting a previously selected altitude to be quickly captured without excessive acceleration of the craft normal to the flight path, even though the human pilot may have neglected to arm the automatic capture mode of the apparatus until after the time that the automatic capture mode is normally commanded.

15 Claims, 4 Drawing Figures

ACCELERATION LIMITED PRESELECT ALTITUDE CAPTURE AND CONTROL

BACKGROUND OF THE INVENTION

1. Field of the Invention

The present invention relates generally to automatic flight control systems for aircraft and more particularly to altitude acquisition and control portions of such flight control systems permitting a previously selected altitude to be quickly captured without enduring excessive accelerations of the craft normal to the flight path, even though the human pilot may have neglected to arm the automatic capture mode until after the normal automatic capture initiation situation has passed.

2. Description of the Prior Art

Automatic altitude control systems often include an altitude hold sub-system whose operation may be initiated by the human pilot. When the altitude hold mode is selected, the output of a barometric, aneroid, or other altitude pressure sensor is, in effect, clamped at the pressure altitude existent when the altitude hold mode was initiated. Then, a signal proportional to any deviation from the clamped altitude pressure is continuously supplied through the automatic pilot pitch channel, operating the pitch axis control surfaces so as to reduce the altitude pressure deviation to zero, thus maintaining the aircraft in level flight at the selected or clamped altitude.

Most altitude control systems include subsystems whereby a desired altitude may be preselected by the human pilot while the craft is still flying at an entirely different altitude. The altitude preselect sub-assembly is coupled with the altitude pressure sensor in such a manner that, when the craft reaches the selected altitude, a deviation signal is provided to maintain the craft at the selected altitude. In altitude preselect systems of the latter type, capture of the preselected altitude may be automatically accomplished. For example, after the new altitude has been selected, the human pilot may manually establish a desired rate of climb or rate of descent to the selected altitude. This vertical speed may be automatically maintained through the flight control system by providing a control signal to the pitch control channel thereof proportional to desired vertical speed and, as the craft approaches the selected altitude, the human pilot manually arms the capture mode. The capture mode is designed to permit the aircraft automatically and smoothly to capture the selected altitude without excessive acceleration normal to the flight path or mode engage transients. For this purpose, a null detector is used in which the altitude error $h_e$ (the difference between the selected altitude $h_s$ and the actual altitude $h_a$) is compared with the altitude rate or vertical speed $\dot{h}$. When the result of the comparison is a null, the capture mode apparatus is automatically engaged and any subsequent error is supplied to the automatic pilot pitch channel which controls the craft in a manner such that is asymptotically approaches and thereafter maintains the selected altitude. A limit is usually placed on the error signal supplied to the pitch channel to limit the magnitude of the pitch command, thereby to limit normal acceleration forces imposed upon the aircraft during the capture maneuver.

In altitude preselect systems of the foregoing type, certain precautions have been taken in the past to prevent large mode engage transients and excessive normal accelerations. For example, in a heavy traffic terminal area, the capture mode apparatus may inadvertently not be armed by the pilot prior to the altitude at which the altitude error $h_e$ is not equal to the altitude rate factor so that $h_e - K\dot{h}$ is not substantially zero. In such a case, the human pilot must himself manually maneuver the craft to acquire the selected altitude. Typically, the region around the capture point at which $h_e - K\dot{h} = 0$ may be termed a window in which a null detector of the altitude preselect system can generate an automatic capture signal. If that window has already been passed by the craft, the null detector cannot produce an output and the capture mode apparatus is inhibited. Generally representative of such prior art altitude control systems is that of the Miller U.S. Pat. No. 3,240,446 for a "Preselect Altitude Control System for Aircraft", issued Mar. 15, 1966 and assigned to Sperry Rand Corporation.

The foregoing problems impose operational limitations on the aircraft flight crew, particularly during operations in the terminal area where the aircraft is operating at reduced air speeds and where frequent altitude changes are often demanded from the terminal area ground controller. With many other communication and navigation demands also being made upon the flight crew, it is possible that the pilot may neglect to arm the automatic altitude capture mode apparatus prior to reaching its capture window. In that event, he must now manually capture the selected altitude, diverting his attention from other cockpit duties.

SUMMARY OF THE INVENTION

The present invention provides an altitude control system including an altitude preselect sub-system by means of which automatic altitude capture is performed without the generation of mode-engage transients and without subjecting the aircraft to excessive normal accelerations, even though the human pilot may inadvertently fail to arm the engage mode of the apparatus at the time normal for that event in prior art altitude controllers.

DESCRIPTION OF THE PREFERRED EMBODIMENTS

Figure 1:
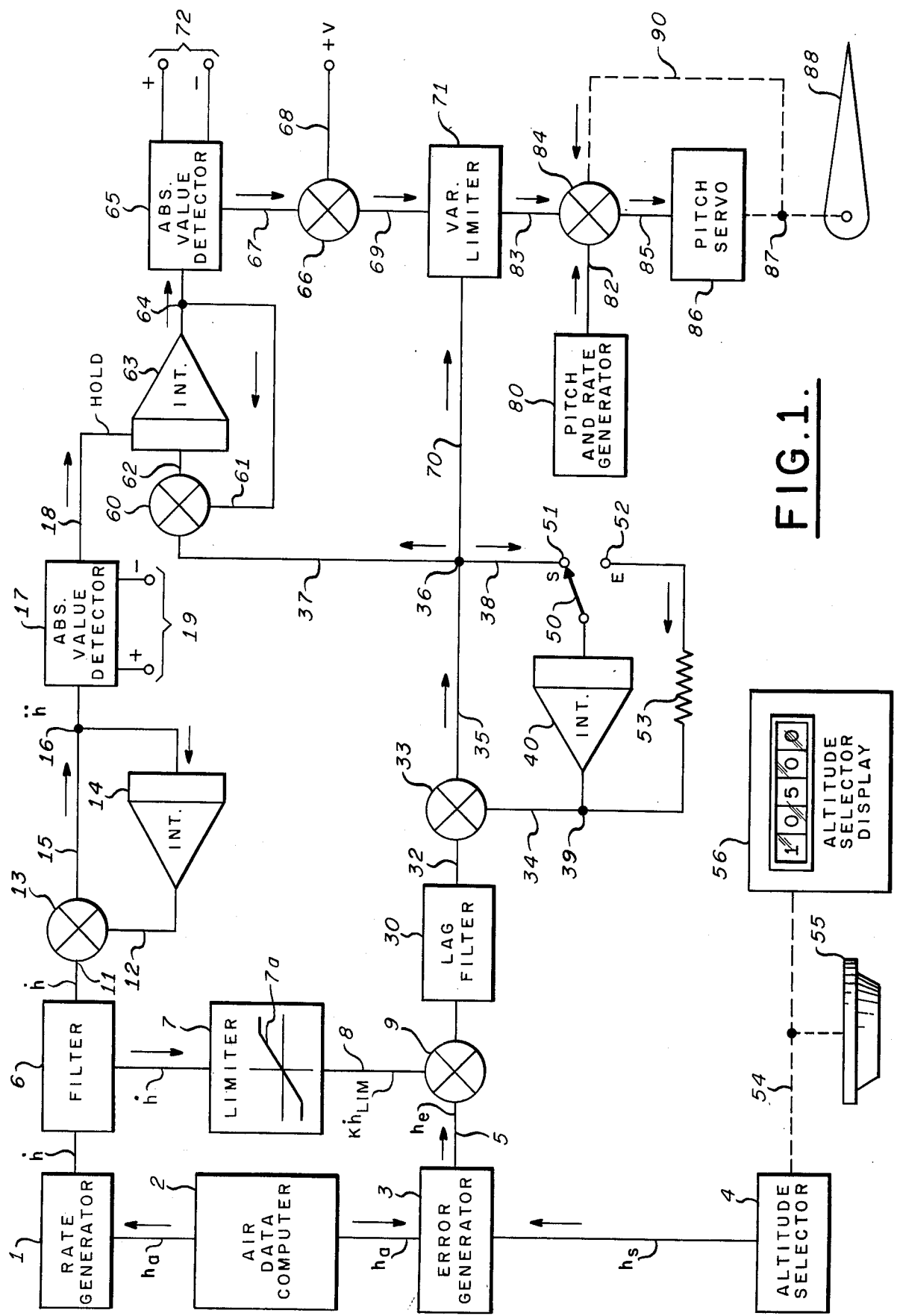
FIG. 1 is a block diagram of an automatic pilot altitude preselect system according to the present invention.

The altitude capture and flight control system of the present invention employs the actual altitude proportional signal $h_a$ derived for example, from a conventional air data computer 2. Another input to the control system is a signal representing a selected altitude value $h_s$ generated by a conventional signal generator such as altitude selector 4. A selected value of $h_s$ is provided to selector 4 through mechanical links 54 by the manual setting of calibrated dial 55, which event may also cause the selected value of $h_s$ to be displayed by a conventional numerical desired-altitude display 56. The signals representative of $h_a$ and $h_s$ are supplied to the error or difference generator 3 for generating an error signal $h_e = h_s - h_a$ to be supplied via lead 5 to a first channel of the invention.

The signal $h_a$ is also supplied by air data computer 2 to a conventional rate generator circuit 1 for the generation of an actual altitude rate signal $\dot{h}$ for injection into a second channel of the novel control. The value $\dot{h}$ is accordingly supplied to filter 6 having low pass band characteristics, so that the circuit output on lead 11 has removed from it undesired source noise, switching transients, and the like. The filtered output of element 6 is coupled to one input 11 of a conventional summing device 13, whose output on lead 15 is representative of altitude acceleration $\ddot{h}$ being coupled at junction 16 to a conventional integrating amplifier 14. The output of integrator circuit 14 is coupled to a second input 12 of the same summation device 13, the closed loop including elements 13 and 14 operating in a conventional manner to generate the acceleration signal representative of $\ddot{h}$ for supply to absolute value detector 17.

Absolute value detector 17 is a conventional circuit such as is previously employed, for example, in the R. W. Schloeman, U.S. Pat. No. 3,908,934 for a "Programmed Gain Control for Aircraft Throttle Control System", issued Sept. 30, 1975 and assigned to Sperry Rand Corporation and also in the similarly assigned H. D. Smith, U.S. Pat. No. 3,981,442 for "Aircraft Engine Automatic Throttle Control with Automatic Programming System", issued Sept. 21, 1976. Absolute value detector 17 is supplied with positive and negative reference voltages on terminal pair 19 from a conventional power supply (not shown). The unipolar output of detector 17 is coupled via lead 18 to the conventional hold terminal of integrator amplifier 63. Detector circuit 17 is one of a conventional class of circuits adapted, in effect, for rectifying both polarities of a bipolar input signal so that a signal of only one predetermined polarity appears on its output lead 18 for application in the integrator 63, whose role remains to be discussed.

The aforementioned first channel of the novel control system is responsive to the signal representative of $h_e$ at input 5 of summation device 9. To form a second input 8 of summation device 9, the same filtered signal $\dot{h}$ as appears on lead 11 is also coupled to a conventional limiter 7 having the characteristic limiter curve 7a shown on the face of block 7; limiter 7 limits the amplitude of the signal passing therethrough to fall within a symmetric range of positive and negative values around zero volts. This limited bipolar signal is coupled to a second input 8 of summation device 9 so that the output of the latter is representative of $h_e + K\dot{h}_{LIM}$, where K is a predetermined proportionality constant.

The output of summation device 9 is applied to the conventional lag filter 30 and is passed to a further input terminal 32 of a similar summation device 33. The input 32 of summation device 33 accepts the total output signal of lag filter 30 and supplies a version of it via lead 35 to output terminal 36 for use as will be further discussed. With switch 50 placed on the synchronizing mode contact 51, the signal at output terminal 36 is also coupled via lead 38 to the input of integrating amplifier 40 whose output is coupled by terminal 39 to a further input 34 of summation device 33. The integral loop 33, 51, 50, 40, 39 has a relatively short time constant, for example, of about 0.1 seconds. When the altitude capture mode is to be engaged, switch blade 50 is moved downward to a second switch contact 52, so that current flows through a circuit including resistor 53 and terminal 39 and into the summation device input 34 with a relatively long time constant, about 6 seconds, for example, thus discharging the integrator circuit 40 at a predetermined rate. Switch 50 is automatically returned to contact 51 after the capture maneuver has been executed.

Leads 37 and 70 branch from terminal 36, lead 70 feeding the voltage on terminal 36 directly to one input of a variable limiter circuit 71, whose structure and operation remains to be discussed in greater detail in connection with FIG. 2. The voltage on terminal 36 is also fed by lead 37 to an input of summation device 60 whose output is coupled through integrator 63 and terminal 64 to a second absolute value detector 65 similar to detector 17. Absolute value detector 65 is supplied with reference positive and negative voltages via the lead pair 72 from a regulated power supply (not shown). A second input signal for summation device 60 is coupled from output terminal 64 of integrator 63 to the summation device input 61. As previously noted, integrating amplifier 63 has a hold terminal controlled by the output on lead 18 of absolute value detector 17. The loop has substantially the same time constant as the loop involving integrator loop 33, 51, 50, 40, 39.

The output of absolute value detector 65 is coupled by lead 67 to one input of a conventional summation device 66 having a biasing unidirectional input 68 whose value is manually set by a calibrated source (not shown). The voltages on leads 69 and 70 are supplied to the aforementioned variable limiter 71 of FIG. 2, the signal on lead 69 determining the degree of limiting of the signal on lead 70. Variable limiter 71 is an element of basic importance in the invention; it is controlled by a combination of the altitude error signal and altitude rate and the electronically derived barometric altitude acceleration signal $\ddot{h}$.

The output of limiter 71 is coupled via lead 83, summation device 84, and lead 85 as a pitch rate command to operate the conventional flight control servo 86 which controls the aircraft pitch axis control surface 88 through mechanical link 87. Other conventional pitch axis control signals arising in conventional parts 80 of the aircraft flight control system are coupled via lead 82 to a second input of summation device 84 and aid as additional and normally used in controlling the pitch axis control surface 88 in the usual stable manner. Similarly, a position feed back characteristic of the position of control surface 88 may be supplied by mechanical or other link 90 as a further input of summation device 84.

Operation of the novel system normally begins with manual switch 50 being coupled to its associated synchronizing contact 51. Consider, by way of example, that the aircraft is being flown at some arbitrary flight path such as path 149 of FIG. 4. Assume also that the pilot has turned selector dial 55 to a desired selected altitude value $h_s$, such as the 10,500 foot value indicated by way of example on display 56 and has maneuvered the aircraft to a desired approach path. In this circumstance, the loop including lag filter 30 and summation device 9 or the first channel simply follows the combined $h_e + K\dot{h}_{LIM}$ signal at the input of summation device 9; that is, it synchronizes itself so that the output at lead 32 is a substantially zero pitch rate command signal supplied via leads 37, 70 to the variable limiter 71 and thence to pitch servo 86. However, the variable limiter 71, in the absence of an input on lead 67, receives a constant bias signal from input 68 and summation device 66. This bias input may be thought of as an enabling signal desirably permitting a pitch error signal of a particular magnitude to pass through variable limiter 71 when present on lead 70, as will be further described.

The aircraft is now approaching the desired or selected altitude level 153. Assume that the aircraft has passed the auto capture window and that the pilot now arms the capture mode by moving switch 50 from the synchronizing contact 51 to the engage contact 52. Upon switch 50 engagement with contact 52, the voltage at point 36 begins to build due to the $h_e$ change at the input 32 of summation device 33 and the change in the output of integrator 40 since its output is now being fed back to the input. The resultant signal passes through variable limiter 71 to command pitch servo 86 to move control surface 88 and, accordingly, to subject the aircraft to a corresponding corrective pitch rate. The aforementioned bias level set into summation device 66 at input 68 is arbitrarily selected and normally remains fixed at a predetermined value such that, when the craft is at its maximum air speed, the commanded pitch rate will never result in a maneuver causing an incremental normal acceleration greater than a predetermined magnitude, say 6.4 ft./sec.². This arbitrary acceleration limit permits the craft to be maneuvered at high speeds to acquire the selected altitude in an efficient manner and with a comfortable load factor.

As a consequence of the use of a fixed value for the bias signal at input 68, a problem arises when the aircraft is flown at relatively low air speeds, such as at those speeds employed normally in a terminal area. At such low air speeds, the fixed bias value undesirably results in sluggish and unreliable capture of the preselected altitude. According to the invention, a further loop employing integrator amplifier 63 is employed; in effect, the further arrangement increases the bias signal applied to variable limiter 71.

Integrator 63 is used to correct operation in the lower ranges of craft speed; its input on lead 37 is the pitch rate command also found at the input 70 of variable limiter 71. The pitch rate command value is stored by integrator 63 by virtue of summation device 60 and the feed back connection 64, 61 and may be supplied via absolute value detector 65 to input 67 of summation device 66. The loop associated with integrator 14, as previously discussed, electronically generates a barometric altitude acceleration signal $\ddot{h}$ which, when of sufficient magnitude, passes through detector 17 via lead 18 to the hold input of integrator 63. The threshold of detector 17 is arbitrarily adjusted to permit a predetermined normal acceleration of say 6.4 ft./sec.², a value coordinated with the bias value set in upon input 68 of summation device 66.

When absolute value detector 17 passes a signal on its output lead 18, it causes integrator 63 to continue its output at terminal 64 at the value present at the instant the hold signal arrived; in this manner, the signal passing through detector 65 to variable limiter 71 cannot increase, thereby preventing any change in the pitch control signal at lead 83. In this manner, the aircraft completes the maneuver along path 152, capturing the preselected altitude level 153 in a smooth and efficient manner and without an excessive normal acceleration. As the craft follows path 152 to the selected altitude level 153, the error signals $h_e$ and $Kh_{LIM}$ both decrease toward zero and the pitch command and barometric acceleration $\ddot{h}$ signals likewise smoothly decrease to zero. At some point in this program, absolute value detector 17 no longer produces an output, and the limit value is no longer determined thereby. In effect, the limit value is slaved via the summing devices 60 and 66 to the magnitude at the variable limiter input 69. In this manner, where it is generally not possible for the human pilot to engage the altitude capture mode early enough to follow the asymptotic path 150 of FIG. 4 into level flight at the desired altitude 153, he is enabled to execute flight in a path 152 which represents a mild and smooth over-shoot of the desired altitude. Nevertheless, he is enabled to avoid the excessive maneuver represented by path 151 which would occur in the absence of the invention when a late altitude capture attempt is made.

Figure 2:
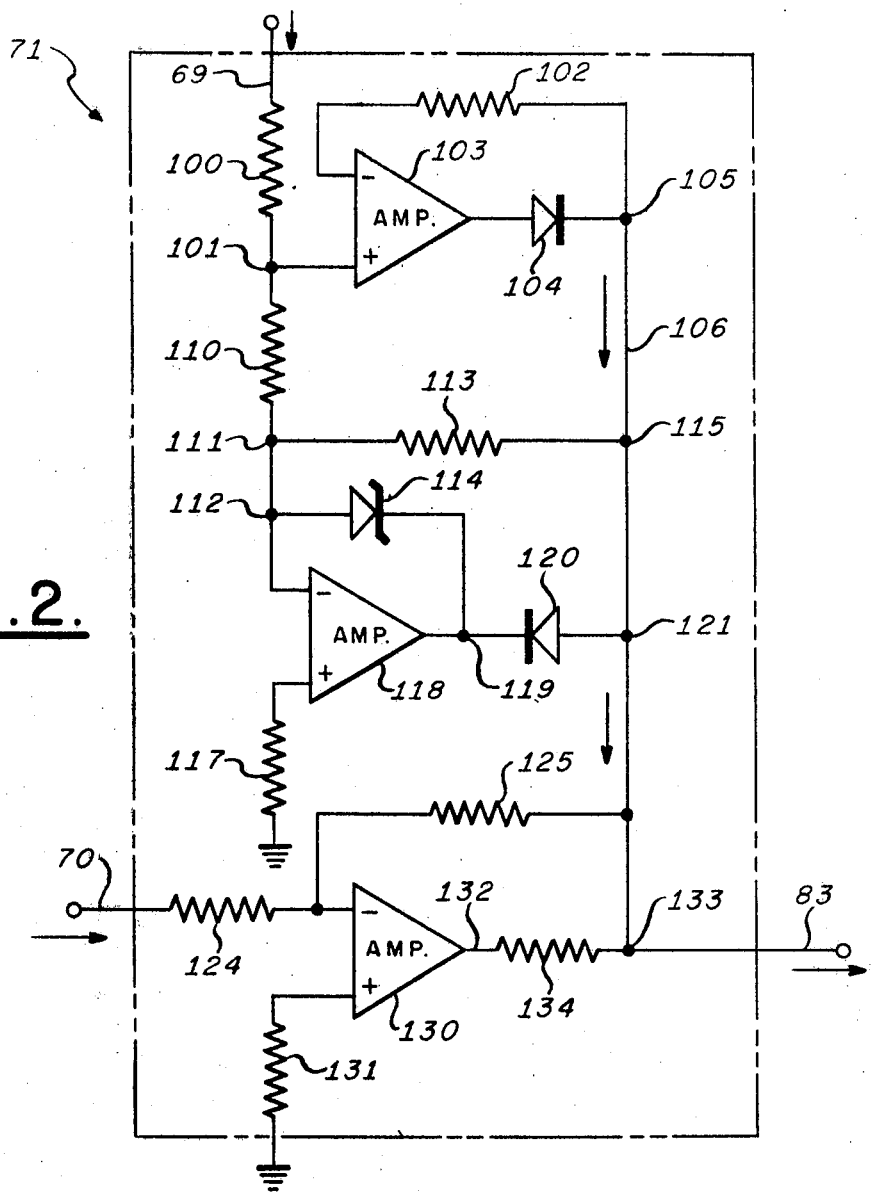
FIG. 2 is a wiring diagram showing electrical components and interconnections of the variable limiter employed in FIG. 1.

Details of the variable limiter 71 are illustrated in FIG. 2, where leads 69 and 70 represent the input leads shown in FIG. 1 and lead 83 is the variable limiter output signal of FIG. 1. The primary pitch axis control signal passes along input lead 70 through resistor 124 to a first input of amplifier 130, poled as shown, the second input terminal of amplifier 130 being coupled through resistor 131 to ground. The output of amplifier 130 is coupled through resistor 134 and terminal 133 to output lead 83. Terminal 133 is also connected through resistor 125 at the input to amplifier 130, associated with input resistor 124.

The upper portion of FIG. 2 represents the limiter circuit using the input on lead 69 to limit the amplitude of the control input at lead 70 as described in the foregoing. The input lead 69 is coupled by terminal 101 through resistors 100, 110. Terminal 101 is connected to one input of amplifier 103, poled as shown, whose output is coupled by diode 104, poled as shown, to terminal 105 of nodal conductor 16. Terminal 105 is coupled via resistor 102 to the second input of amplifier 103. The second terminal 111 opposite terminal 101 of resistor 110 is coupled via resistor 113 to terminal 115 of nodal conductor 106.

Terminal 111 is also coupled to a first input of amplifier 118, poled as shown, whose second input is coupled by resistor 117 to ground. The output of amplifier 118 is coupled through terminal 119 and diode 120, poled as shown, to a further terminal 121 of nodal conductor 106. Terminal 119 is connected through Zener diode 114, poled as shown, to terminal 112. Since nodal conductor 106 is also coupled to the aforementioned terminal 133 of amplifier 130, the components of the signal level on conductor 106 are seen to influence the output of amplifier 130 on lead 83 in a novel limiting manner.

Figures 3, 4:
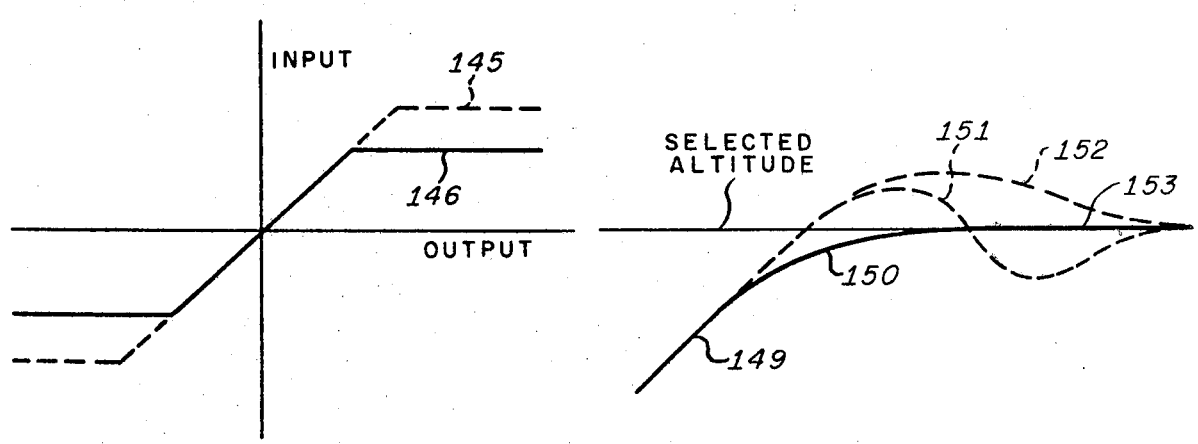
FIGS. 3 and 4 are graphs useful in explaining the operation of the invention.

In operation, the limit control signal enters device 71 on lead 69 and establishes a corresponding voltage level at terminal 101 between resistors 100 and 110. The predetermined gain of the conventional amplifier-limiter stage associated with amplifier 103 establishes the level of the negative limit at terminal 105 (FIG. 3). The predetermined gain of the conventional amplifier-limiter stage associated with amplifier 118 establishes the level of the positive limit at terminal 121. The combination of the two stages is applied to the output of signal amplifier 130, the characteristic curves of FIG. 3 representing the most open limiting situation at 145 and an intermediate limiting situation at 146. Thus, the useful output at lead 83 is limited by the clamping action on amplifier 130 of positive and negative limits and is variable depending upon the voltage level on lead 69, the positive and negative limits being controlled by that voltage level. The positive and negative limits increase and decrease together, being a function of the signal on lead 69 until that signal exceeds the level which might cause a craft maneuver with dangerous acceleration normal to the flight path.

Accordingly, it is seen that the invention provides an altitude capture and control system compatible with conventional types of aircraft automatic pilots having a pitch axis control, the invention permitting a previously selected altitude to be quickly and efficiently acquired without excessive acceleration of the craft normal to its flight path, even though the human pilot may have neglected actually to arm the capture mode until after the time that it is normally commanded. A variable limiter is employed for limiting the value of the control signal applied to the pitch channel servo, the level of the limiting being determined as a function of the limiter input signal and acceleration of the craft normal to the flight path. Prior to late engagement of the capture mode, the invention synchronizes the altitude error or altitude rate signal using the integral feed back technique. Then, after engagement of the capture mode, the signal stored in the integration process is bled off as a control signal. Accordingly, the limiting value is slaved to the magnitude of the pitch maneuver command signal. Should the altitude error, altitude rate signal be sufficient to adjust the limit level to an undesired value that might allow an excessive pitch rate and thus undesired high craft accelerations normal to the flight path, the limit level is clamped at a predetermined safe level.

While the invention has been described in its preferred embodiment, it is to be understood that the words which have been used are words of description rather than of limitation and that changes may be made without departing from the true scope and spirit of the invention in its broader aspects.

We claim:

1. In an altitude preselect system for aircraft autopilots, apparatus for initiating capture and thereafter capturing a preselected altitude with minimum engage transients, minimum overshoot, and within a predetermined g-limit, the combination comprising:
   means including altimeter means and altitude selector means for providing an altitude error signal proportional to the difference between the actual aircraft altitude and said preselected altitude,
   means for supplying a signal proportional to the rate of change of altitude of said aircraft,
   means responsive to said altitude error signal and said altitude rate signal for providing a pitch rate command signal for said autopilot,
   variable limiter means having an input responsive to said pitch rate command signal for limiting the magnitude of the craft pitch command rate,
   synchronizer means responsive to said pitch rate command signal for maintaining said input signal to said variable limiter means substantially at a zero level prior to altitude capture,
   altitude capture engage means,
   means responsive to said altitude capture engage means for interrupting said synchronizer means and for slaving the degree of limiting of said variable limiter means in proportion to the value of said pitch rate command signal up to a predetermined value corresponding to a predetermined g-limit.

2. The apparatus as set forth in claim 1 wherein said slaving means includes means responsive to said altitude rate signal for deriving a signal proportional to altitude acceleration of said aircraft and means responsive to a value of said altitude acceleration signal corresponding to said predetermined g-limit for clamping said slaving means.

3. The apparatus as set forth in claim 2 further including bias means for said variable limiter means for limiting said pitch rate command signal to a predetermined minimum value.

4. In a craft flight control system, apparatus for controlling craft flight from a first altitude to a second altitude and the capture of said second altitude comprising:
   sensor means for sensing said first altitude,
   selector means for selecting said second altitude,
   combining means responsive to said sensor means and to said selector means for generating a difference signal,
   variable limiter means responsive to said difference signal, and
   servo means for controlling said craft with respect to the pitch axis thereof in response to motion of said craft about said pitch axis and in addition in response to said variable limiter means,
   said variable limiter means having limits adjustable in magnitude in response to said difference signal.

5. Apparatus as described in claim 4 additionally including first integrator means responsive to said combining means for controlling said limits of said variable limiter means as a function of said difference signal.

6. Apparatus as described in claim 5 additionally including first absolute value detector means responsive to said first integrator means for further controlling said limits.

7. Apparatus as described in claim 6 additionally including bias means for adding a bias signal to an output signal of said first absolute value detector means before application thereof to said variable limiter means.

8. Apparatus as described in claim 7 additionally including:
   means for generating a signal representative of the rate of change of said first altitude, and
   summation means responsive to said signal representative of the rate of change of said first altitude and to said difference signal and being in series relation with said variable limiter means.

9. Apparatus as described in claim 8 additionally including fixed limiter means for limiting the positive and negative excursions of said signal representative of the rate of change of said first altitude before application to said summation means.

10. Apparatus as described in claim 7 additionally including:
    means for generating a signal representative of the first time derivative of said rate of change of said first altitude,
    said signal representative of said first time derivative being coupled to hold input means of said first integrator means for causing said first integrator means to hold its operating level when said signal representative of said first time derivative exceeds a predetermined magnitude.

11. Apparatus as described in claim 10 additionally including second absolute value detector means responsive to said signal representative of said first time derivative before application thereof to said hold input means.

12. Apparatus as described in claim 10 additionally including:
    summation means having first input means, output means, and second input means,
    said first input means and said output means being coupled in series relation between said combining means and said variable limiter means, said integrator means having output means coupled to said summation means second input means, resistor means additionally coupled to said summation means second input means, and selector switch means for coupling said output means of said summation means selectively through said second integrator means or through said resistor means to said summation means first input means.

13. Apparatus as described in claim 12 additionally including lag filter means coupled between said combining means and said summation means first input means.

14. Apparatus as described in claim 4 additionally including:

pick-off means for generating a signal representative of an output of said servo means, craft pitch sensor means, and means including said servo means responsive to said pick-off means, to said craft pitch sensor means, and to said variable limiter means for controlling said craft about said pitch axis.

15. Apparatus as described in claim 4 wherein said variable limiter means includes:

amplifier means having input means responsive to said combining means for controlling said servo means, and first and second amplifier-limiter means coupled in parallel relation for adjusting said limits in response to said summation means by clamping said amplifier input means, said first amplifier-limiter means establishing the positive limit level of said variable limiter means, and said second amplifier-limit means establishing the negative limit level of said variable limiter means.

* * * * *